(12) United States Patent
Bajaj et al.

(10) Patent No.: US 9,236,752 B2
(45) Date of Patent: Jan. 12, 2016

(54) METHOD AND SYSTEM FOR VOLTAGE COLLAPSE PROTECTION

(71) Applicant: QUALCOMM Incorporated, San Diego, CA (US)

(72) Inventors: Nihit Bajaj, San Diego, CA (US); Cheong Kun, San Diego, CA (US); Baiying Yu, Santa Clara, CA (US); Hua Guan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 13/804,666

(22) Filed: Mar. 14, 2013

(65) Prior Publication Data

US 2014/0070618 A1 Mar. 13, 2014

Related U.S. Application Data

(60) Provisional application No. 61/698,208, filed on Sep. 7, 2012.

(51) Int. Cl.
*H02J 7/04* (2006.01)
*H02J 7/00* (2006.01)

(52) U.S. Cl.
CPC ............ *H02J 7/0052* (2013.01); *H02J 7/0031* (2013.01); *H02J 7/0034* (2013.01); *H02J 2007/0037* (2013.01); *Y10T 307/625* (2015.04)

(58) Field of Classification Search
CPC ............ H02J 7/0052; H02J 7/70; H02J 7/003
See application file for complete search history.

(56) References Cited

U.S. PATENT DOCUMENTS

| | | | |
|---|---|---|---|
| 7,105,951 B2 | 9/2006 | Matsunaga | |
| 7,528,574 B1 | 5/2009 | Adkins et al. | |
| 2006/0170398 A1* | 8/2006 | Gangsto et al. | 320/132 |
| 2009/0096427 A1 | 4/2009 | Yang | |
| 2010/0270862 A1 | 10/2010 | Miyanaga et al. | |
| 2011/0095729 A1* | 4/2011 | Tsuji | H02J 7/0068 320/162 |
| 2011/0148360 A1 | 6/2011 | Lee | |
| 2012/0025615 A1 | 2/2012 | Kim et al. | |
| 2012/0025845 A1* | 2/2012 | Carrobe et al. | 324/551 |
| 2012/0091812 A1 | 4/2012 | Lin et al. | |
| 2013/0063078 A1* | 3/2013 | Nishida | H02J 7/0034 320/107 |

OTHER PUBLICATIONS

International Search Report and Written Opinion—PCT/US2013/057954—ISA/EPO—Mar. 4, 2014 (124277WO).

\* cited by examiner

*Primary Examiner* — Rexford Barnie
*Assistant Examiner* — Terrence Willoughby
(74) *Attorney, Agent, or Firm* — Fountainhead Law Group P.C.

(57) ABSTRACT

Disclosed is battery charging circuit having a first detection circuit and a second detection circuit for detecting when to terminate an activated voltage collapse protection operation. The first detection circuit may be an analog design and the second detection circuit may include digital circuitry.

22 Claims, 4 Drawing Sheets

METHOD AND SYSTEM FOR VOLTAGE COLLAPSE PROTECTION

CROSS REFERENCE TO RELATED APPLICATIONS

The present disclosure claims priority to U.S. Provisional App. No. 61/698,208 filed Sep. 7, 2012, the content of which is incorporated herein by reference in its entirety for all purposes.

BACKGROUND

Unless otherwise indicated herein, the approaches described in this section are not prior art to the claims in this application and are not admitted to be prior art by inclusion in this section.

In a battery charging circuit of a device, when the device's system current load exceeds what a current-limited charger can provide, the voltage output of the charger drops. This condition is referred to as "voltage collapse." Battery charging circuits typically employ voltage collapse protection (VCP) capability to prevent voltage collapse and potential brownouts of the device. VCP operation typically involves connecting the battery to supplement the system load.

When the excessive system load goes away, current from the charger may begin to flow into the battery. If the battery is fully charged or if battery charging is not supposed to happen (e.g., because the battery is too cold or too hot or that charging would otherwise violate industry safety standards), then it is important to cut off the current flow from the charger at the termination of VCP.

SUMMARY

A battery charging circuit may provide voltage collapse protection (VCP) to protect an external power source from voltage collapse due to an increased current load by connecting a battery to support the current load. VCP termination may be based on sensing current flow into the battery using a first detection circuit and a second detection circuit. In some embodiments, the first detection circuit may have a lower current detection limit that is greater than that of the second detection circuit. In some embodiments, the first detection circuit may have a faster detection time than that of the second detection circuit. The first detection circuit may be an analog circuit and the second detection circuit may include digital circuitry.

In some embodiments, the battery charging circuit may include a battery management system (BMS). The BMS may include digital current sensing circuitry that can be re-purposed for use as the second detection circuit.

DETAILED DESCRIPTION

Figure 1:
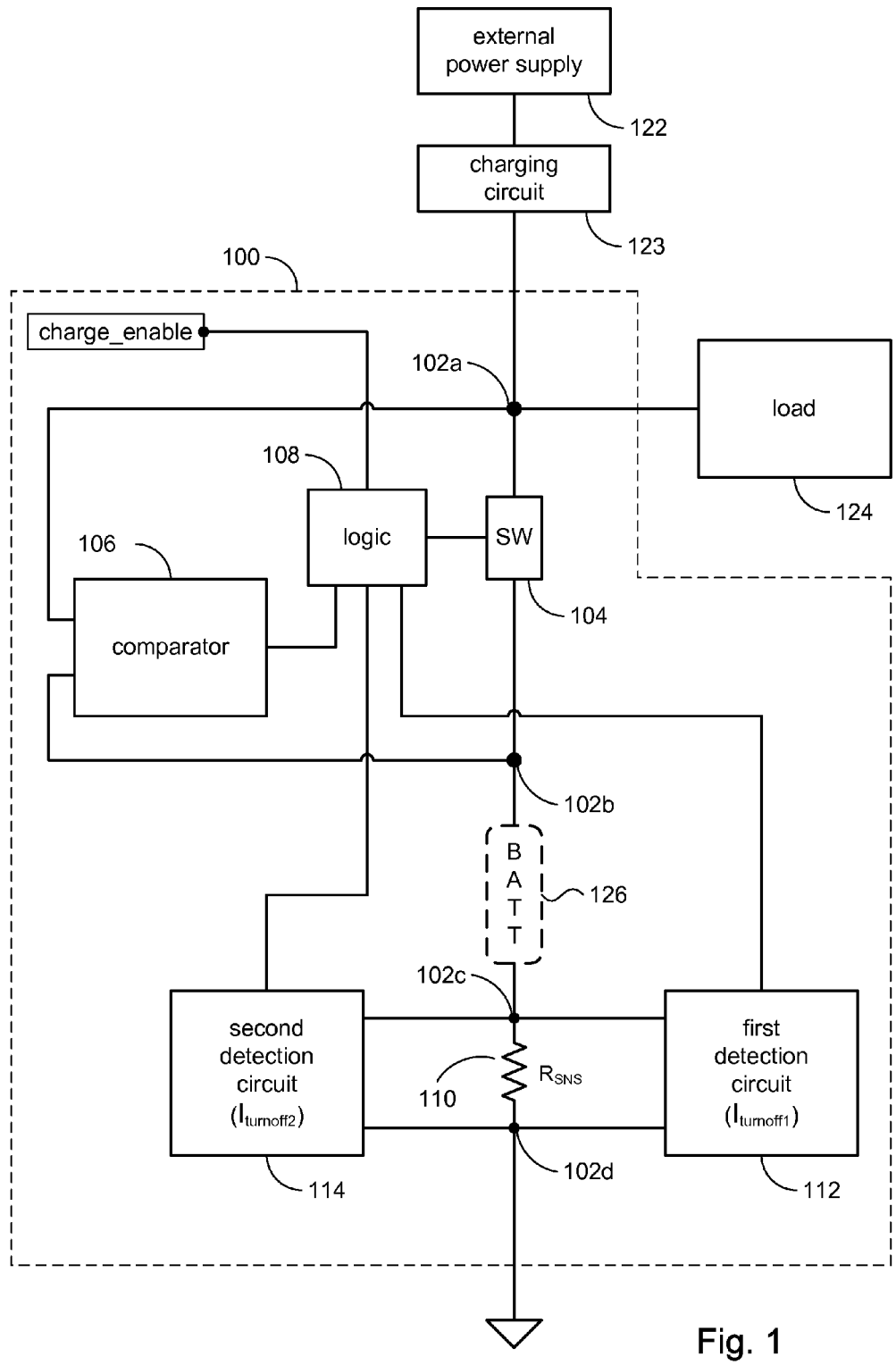
FIG. 1 illustrates an example of a battery charging circuit according to the present disclosure.

FIG. 1 illustrates a high level block diagram of a battery charging circuit 100 having voltage collapse protection in accordance with the present disclosure. In some embodiments, the circuit 100 comprises a system power node 102a, a battery node 102b, sense nodes 102c, 102d, a switch 104, a comparator circuit 106, control logic 108, a sense resistor ($R_{SNS}$) 110, and first and second detection circuits 112, 114. In typical embodiments, the circuit 100 may include terminals (not shown) in order to connect a rechargeable battery 126 to nodes 102b, 102c of the circuit. The battery 126 may be a single energy cell configuration, or multiple energy cells connected in series (e.g., a 2S stack), etc.

The system power node 102a may be connected to an external power supply 122, typically via a charging circuit 123. In some embodiments, for example, charging circuit may be a buck converter or any suitable DC-DC converter. The external power supply 122 may be a DC regulated voltage source (e.g., an AC adapter) or any other suitable power supply. The switch 104 may be operated to electrically connect node 102a to node 102b, and thus provide a charging path between the external power supply 122 and battery 126.

The circuit 100 may include a terminal (not shown) in order to connect a load 124 to the system power node 102a. As will be explained in more detail below, the load 124 may receive power from the external power supply 122, from the battery 126, or from both power sources. The load 124 may be any electrical circuitry that requires power; e.g., the computing components in a computer tablet, the components of a phone in a smartphone device, a display component, memory, and so on.

The control logic 108 may operate the switch 104 in an ON state to electrically connect the system power node 102a to battery node 102b, and an OFF state to disconnect the system power node from the battery node. A charge_enable signal may be generated by other circuitry (not shown) in the circuit 100 to indicate whether or not the battery can be charged. For example, the charge_enable signal may indicate that the battery 126 should not be charged when the battery is in a fully charged state or the battery temperature is too hot or too cold to perform charging. The control logic 108 may operate the switch 104 in the ON state or OFF state according to the charge_enable signal, asserting logic HI or logic LO respectively.

The comparator circuit 106 may sense a voltage level at the system power node 102a and a voltage level at the battery node 102b, and provide a signal to the control logic 108 based on the sensed voltage levels. In some embodiments, for example, the comparator circuit 106 may assert logic HI when the voltage difference between system power node 102a and battery node 102b falls below a threshold value, and logic LO otherwise. The control logic 108 may operate the switch 104 in the ON state or OFF state further according the logic level of the signal provided by the comparator circuit 106.

The circuit 100 includes a first detection circuit 112 that can assert a signal indicative of current flowing into the battery 126. In some embodiments, the first detection circuit 112 may sense a voltage across the sense resistor 110 as an indication of current flowing into the battery 126. In some embodiments, the first detection circuit 112 is an analog circuit. In accordance with principles of the present disclosure, the circuit 100 further includes a second detection circuit 114 that can assert a signal indicative of current flowing into the battery 126; for example, by sensing the voltage across the sense resistor 110. In some embodiments, the second detection circuit 114 includes digital circuitry. The control logic 108 may operate the switch 104 in the ON state or OFF state further according the signals asserted by the first and second detection circuits 112, 114.

Figure 2:
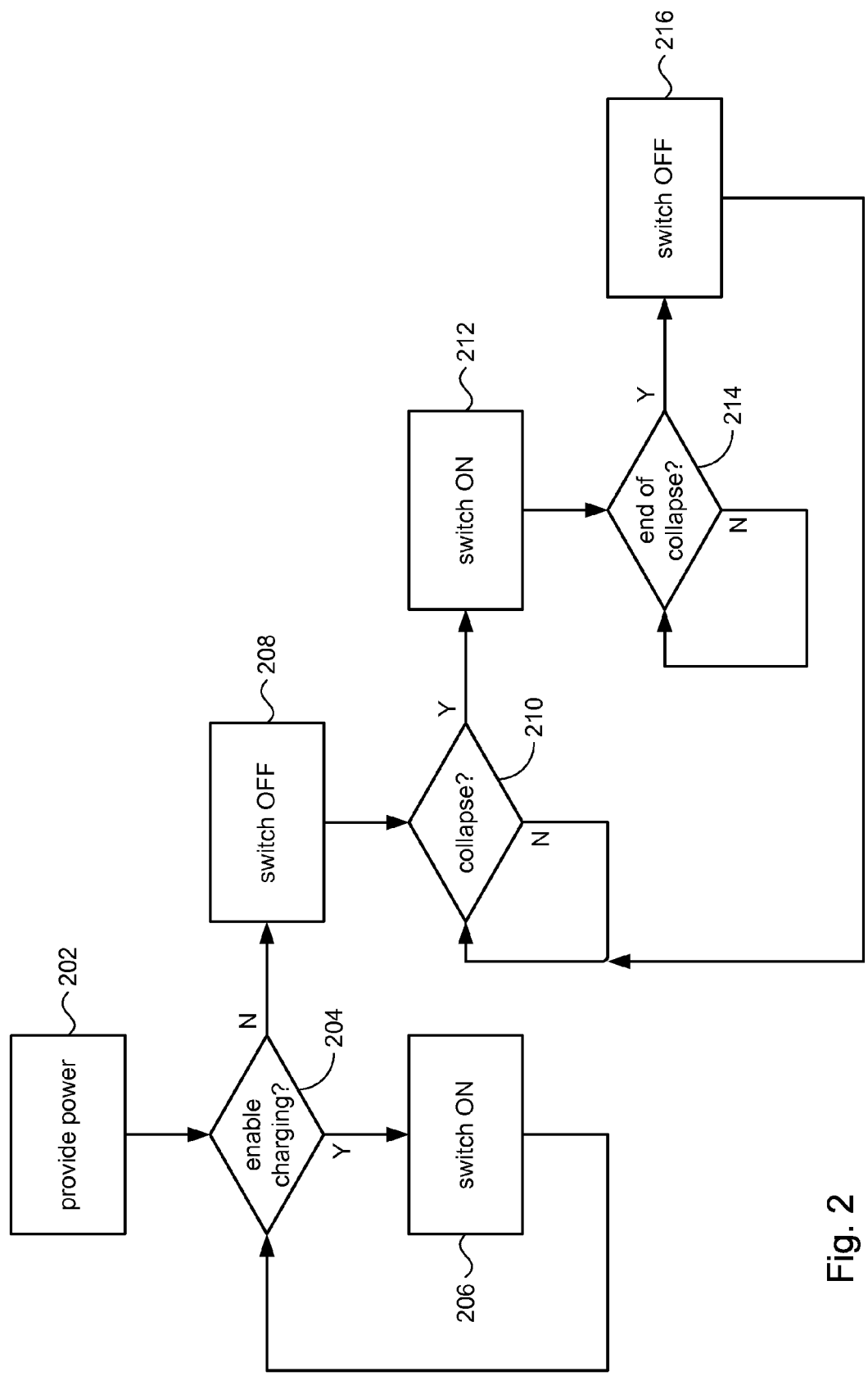
FIG. 2 illustrates a workflow in the battery charging circuit.

FIG. 2 is a flow chart representing an operation of the circuit configuration shown in FIG. 1 and transitions between the operating states of the circuit 100. At block 202, the external power supply 122 provides power to the load 124 via their connections to node 102a. At monitoring block 204, the circuit 100 may determine whether conditions are suitable to enable or disable charging of the battery 126. In some embodiments, industry standards may be used to set forth conditions under which battery charging should or must be disabled. For example, continued charging of a fully charged battery may damage the battery or otherwise shorten the lifetime of the battery. Similarly, charging a battery that is too hot or too cold may also damage or otherwise shorten the battery's useful lifetime. Other criteria for determining whether to enable or disable charging may also be employed.

If, at monitoring block 204, the conditions are suitable for battery charging, then at block 206 the charge_enable signal may assert TRUE and, in response, the control logic 108 may operate the switch 104 in the ON state. Consequently, the external power supply 122 may charge the battery 126 (e.g., using charging circuitry not shown) in addition to providing power to the load 124. The circuit 100 may resume monitoring at block 204.

If the circuit 100 determines, at monitoring block 204, that conditions do not permit battery charging, then the charge_enable signal may assert FALSE. For example, if the battery 126 is or becomes fully charged, then the charge_enable signal may assert FALSE; i.e., battery charging is disabled. Similarly, if the battery temperature is or becomes too high or too low, then the charge_enable signal may assert FALSE in order to disable battery charging. At block 208, the control logic 108 may operate the switch 104 in the OFF state in response to the charge_enable signal asserting FALSE.

The circuit 100 may enter a monitoring loop 210 to detect a system voltage collapse condition. System voltage collapse may occur when the current requirement in load 124 increases to a level that exceeds the capacity of a current-limited external power supply 122. For example, suppose the load 124 is a CPU and a user starts a CPU intensive application, such as viewing a high definition video, playing a video game, etc. The CPU may draw more current than can be provided by the external power supply 122. The excessive current load on the external power supply 122 may cause a voltage drop (voltage collapse) at the output of the external power supply.

In some embodiments, comparator circuit 106 may detect the onset of a voltage collapse condition by sensing the voltage level at system power node 102a and the voltage level at battery node 102b. A voltage collapse condition may be indicated, for example, when the voltage at system power node 102a falls below the voltage at battery node 102b by more than a predetermined amount. It will be appreciated that in other embodiments, other methods to detect a voltage collapse condition may be employed.

When a voltage collapse condition is detected at block 210, the comparator circuit 106 may assert, at block 212, a signal to the control logic 108 to activate a voltage collapse protection (VCP) mode of operation. For example, the control logic 108 may control the switch 104 to the ON state. This connects the battery 126 to system power node 102a, allowing current to flow from the battery into the load 124 to supplement the insufficient flow of current being supplied from the external power supply 122.

The circuit 100 may then enter a monitoring loop 214 to monitor for termination of the voltage collapse condition. For instance, in the example described above, if the user quits out of the video viewer or quits their video game, the current requirement of load 124 may return to a level that can be completely satisfied by the external power supply 122. Current would no longer be drawn from the battery 126 in this case and, in fact, an amount of current may begin to flow into the battery from the external power supply 122. Since, at this point, the operating state of the circuit 100 is that battery charging is disabled (e.g., because the battery is fully charged), then at block 216 the control logic 108 operates switch 104 to the OFF state. The circuit 100 may then return to the monitoring block 210 to monitor for the next occurrence of a voltage collapse condition. As will be discussed, termination of the voltage collapse condition may be detected in monitoring block 214 in accordance with the present disclosure by detecting the reversal of current flow through the battery 126 using first detection circuit 112 and second detection circuit 114.

Figure 3:
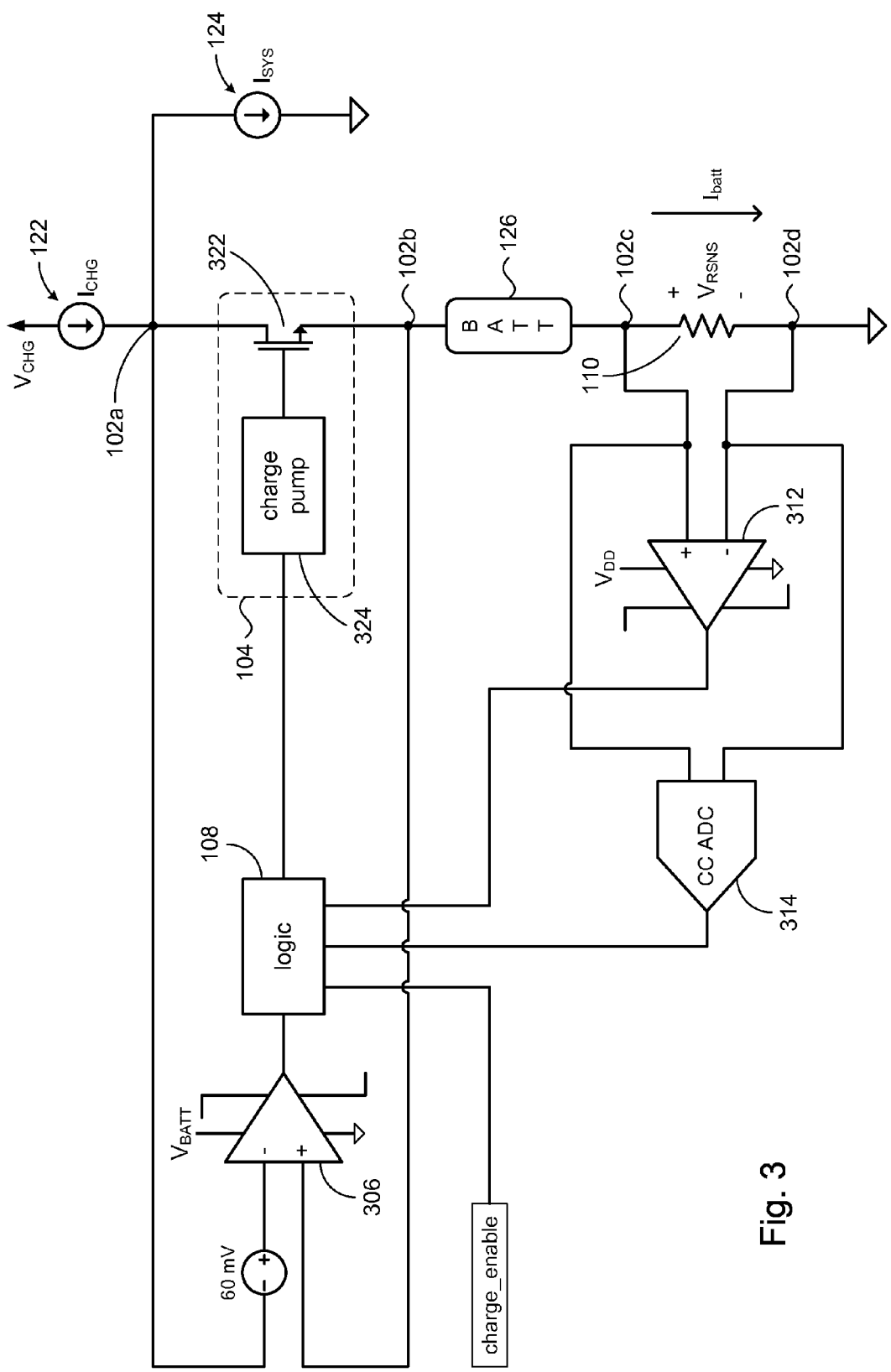
FIG. 3 shows a specific embodiment of the battery charging circuit.

FIG. 3 shows an illustrative implementation of the circuit 100. For instance, an example of the comparator circuit 106 is voltage comparator 306 (e.g., built using an op-amp) to compare the voltage at system power node 102a against the voltage at battery node 102b. A 60 mV offset may be provided to establish a difference between the voltage levels at nodes 102a, 102b. When the difference between the battery node 102b and the system power node 102a (e.g., $V_{102b} - V_{102a}$) is less than 60 mV, then the output of the voltage comparator 306 will be at ground potential. The logic 108 will maintain switch 104 in the OFF state.

When the voltage at system power node 102a falls 60 mV below the voltage at battery node 102b, then the output of the voltage comparator 306 will be at the power supply of the voltage comparator, such as $V_{BATT}$ for instance, and system voltage collapse is deemed to have occurred or to be imminent and VCP can be activated (e.g., per block 212, FIG. 2); e.g., the logic 108 will operate the switch 104 to the ON state. It will be appreciated, of course, that the 60 mV value is implementation specific and may be a value other than 60 mV in a different implementation.

The switch 104 may comprise a charge pump 324 and a field effect transistor (FET) 322 or other switch device. The charge pump 324 may be used to provide a large gate bias voltage in order to minimize the drain-source resistance when the FET 322 is ON (conductive state).

In an embodiment, the first detection circuit 112 shown in FIG. 1 may be implemented using an analog comparator 312. The comparator 312 may compare the voltage across the sense resistor 110. The voltage ($V_{RSNS}$) across sense resistor 110 ($R_{SNS}$) represents the current flow ($I_{batt}$) through battery 126 according to the following:

$$I_{batt} = V_{RSNS}/R_{SNS}.$$

During voltage collapse protection, as current $I_{batt}$ flows from the battery 126 into the load 124, the output of the comparator 312 will go to ground potential (e.g., $V_{SS}$). When the voltage collapse condition has terminated, current $I_{batt}$ may being to flow from the external power supply 122 into the battery 126, and the output of the comparator 312 will go positive (e.g., $V_{DD}$). The current flowing into battery 126 may be undesirable, for example, if the battery is fully charged. Accordingly, the positive voltage output of the comparator 312 may serve to trigger the control logic 108 to operate switch 104 to the OFF state to terminate VCP to prevent unintentional charging of the battery 126 (e.g., per block 216, FIG. 2).

Being an analog circuit, comparator 312 can provide a very fast determination that current $I_{batt}$ is flowing into the battery 126. For example, op-amps, which may be used in the design of analog comparators, are typically characterized by a parameter that indicates responsiveness called "settling time", which can be on the order of tens of nanoseconds. The quick detection response time of comparator 312 is advantageous because it reduces the amount of time of unintentional charging of the battery 126.

However, comparator 312 has an inherent offset voltage, $V_{OS}$, that limits the low end of the current detection range of the comparator, which may be defined by $I_{turnoff1} = V_{OS}/R_{SNS}$; i.e., a current flow less than $I_{turnoff1}$ may not be detected by the comparator. In a particular embodiment, for example, the comparator 312 can be designed to detect current levels down to about $I_{turnoff1} = 100$ mA. If, after termination of the voltage collapse condition, the external power supply 122 sources about 100 mA or less of current into the battery 126, the comparator 312 may not be able to detect the current flow. The switch 104 will not turn OFF and current will continue to flow into the battery 126. If the battery 126 is fully charged, this unintentional charging current may damage the battery or otherwise violate industry safety standards relating to battery charging.

The low end $I_{turnoff1}$ of the current detection range of comparator 312 may be reduced by reducing the offset voltage $V_{OS}$ of the comparator. However, comparator implementations that have very low offset voltage ratings typically involve designs that require large area and/or consume high power. Such design parameters are not suitable for small low power devices. Accordingly, comparator designs that are suitable for battery charging circuits have a low end of current detection on the order of 100 mA or so.

In accordance with principles of the present disclosure, a second detection circuit 114 (FIG. 1) may be provided, in addition to the comparator 312, that has a lower current detection limit ($I_{turnoff2}$, where $I_{turnoff2} < I_{turnoff1}$) than the comparator. In some embodiments, the second detection circuit 114 may be an analog to digital converter (ADC) circuit. In a particular embodiment, the second detection circuit 114 may employ a coulomb counting (CC) ADC 314. For example, the CC ADC 314 may be designed to detect current as low as $I_{turnoff2} = 2.5$ mA. It will be appreciated that other ADC designs may be used, for example, a sigma-delta ADC.

Both the comparator 312 and the CC ADC 314 may sense the voltage $V_{SNS}$ across $R_{SNS}$ to detect battery current $I_{batt}$. The comparator 312 can detect a current $I_{batt}$ flowing into the battery 126 as low as about $I_{turnoff1}$ and signal the logic 108 to turn off the switch 104. The CC ADC 314 can detect a current $I_{batt}$ flowing into the battery 126 as low as about $I_{turnoff2}$ and signal the logic 108 to turn off the switch 104.

Thus, if only about 100 mA or less of current begins flowing from the external power supply 122 into the battery 126 after termination of the voltage collapse condition, the comparator 312 may not be able to detect such flow; however, CC ADC 314 will detect the flow (down to about 2.5 mA). Accordingly, the CC ADC 314 may trigger the control logic 108 to operate switch 104 to the OFF state to terminate VCP operation and thus prevent unintentional charging of the battery 126 (e.g., per block 216, FIG. 2).

Though ADC circuits are able to sense low current levels, high accuracy ADC designs typically operate more slowly relative to analog comparators. The resulting unintended charging during the time it takes a high accuracy ADC to detect a small charging current (e.g., less than about 100 mA) after termination of the voltage collapse condition may be tolerable, however. On the other hand, the resulting unintended charging during the time it takes an ADC to detect a large charging current (e.g., greater than 100 mA) after termination of the voltage collapse condition may not be tolerable. Accordingly, the comparator 312, acting in parallel with ADC 314, can very quickly respond to large charging currents and turn OFF switch 104 to terminate VCP operation and prevent unintentional charging.

High speed and high accuracy ADC designs are available. However, such designs are typically very large (i.e., require large areas of silicon to build) and consume large amounts of power to operate. High speed, high accuracy ADCs, therefore, are typically not suitable for small low power devices.

Accordingly, the present disclosure offers an advantageous solution that can provide fast sensing of large currents (e.g., using analog comparator 312) to quickly terminate VCP operation and thus avoid potentially damaging unintended battery charging due to large currents. At the same time, the present disclosure can terminate VCP operation when only small charging currents arise after termination of the voltage collapse condition; e.g., by detecting the small current using CC ADC 314.

Figure 4:
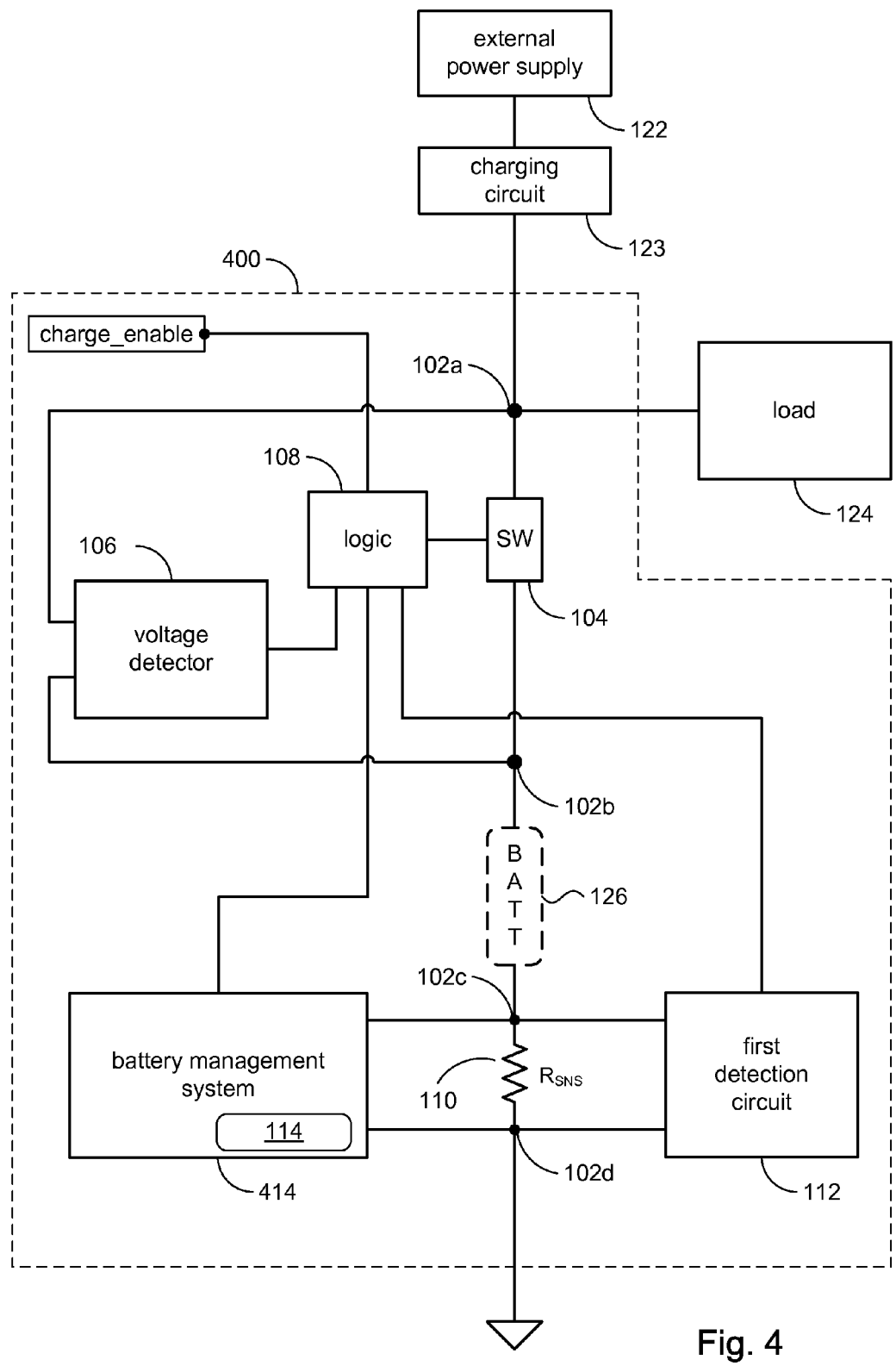
FIG. 4 shows an embodiment of the battery charging circuit that employs a battery management system.

Referring to FIG. 4, in some embodiments, the circuit 100 may include a battery management system (BMS) 414. As the name implies, the BMS 414 performs various functions to manage the output, charging, and discharging of the battery (or battery pack) in a device. The BMS 414 may monitor voltage, current, and temperature to provide various notifications on the status of the battery, such as state of charge (SOC), state of health (SOH), and so on.

The BMS 414 typically includes an ADC sub-system, or other similar component, in order to digitize voltage measurements and current measurements for the various functions performed by the BMS. In accordance with the present disclosure, the ADC that is part of the already-exiting BMS 414 in the battery charging circuit 100 may be dynamically re-purposed for use as the second detector circuit 114. Thus, in one mode of operation, the BMS 414 may function to provide its normal battery management functions. During VCP activation, the BMS 414 may reconfigure its current sensing ADC component to function as the second detection circuit 114 to sense the battery current $I_{batt}$ flowing through $R_{SNS}$, along with the first detection circuit 112, in the manner described above. After VCP termination, the BMS 414 may resume operation in its first mode of operation. By re-purposing the ADC circuitry in the BMS 414 to serve as the second detector circuit 114, we can avoid the need to implement a separate circuit as the second detector circuit.

The above description illustrates various embodiments of the present invention along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A battery charging circuit comprising:
 a system power node for a connection to an external power supply;
 a battery node for a connection to a battery;
 a comparator circuit configured to produce a comparator signal in response to a voltage difference between the system power node and the battery node crossing a threshold value;
 a first detection circuit operable to produce a first signal indicative of a current flow into the battery, wherein the first detection circuit is an analog circuit;

a second detection circuit operable to produce a second signal indicative of the current flow into the battery, wherein the second detection circuit comprises digital circuitry;

a battery switch connected between the system power node and the battery node, the battery switch having an ON state and an OFF state, wherein the battery node is electrically connected to the system power node when the battery switch is in the ON state and electrically disconnected from the system power node when the battery switch is in the OFF state; and control logic configured to:
turn ON the battery switch in response to the comparator signal being produced;
turn OFF the battery switch in response to the first signal being produced; and
turn OFF the battery switch in response to the second signal being produced.

2. The circuit of claim 1 wherein the first detector circuit has a first lower detection limit and the second detector circuit has a second lower detection limit that is less than the first lower detection limit.

3. The circuit of claim 2 wherein the first detector circuit has a detection time that is faster than a detection time of the second detector circuit.

4. The circuit of claim 1 wherein the first detection circuit is an analog comparator and the second detection circuit is a sigma-delta analog to digital converter (ADC).

5. The circuit of claim 1 wherein the first detection circuit is an analog comparator and the second detection circuit is a coulomb counting ADC.

6. The circuit of claim 1 further comprising a battery monitoring system (BMS) that is separate from the first detection circuit, wherein the BMS comprises the second detection circuit.

7. The circuit of claim 6 wherein the second detection circuit is a sigma-delta ADC in the BMS.

8. The circuit of claim 6 wherein the second detection circuit is a coulomb counting ADC in the BMS.

9. The circuit of claim 1 further comprising a battery charge enable signal indicative of whether or not battery charging is enabled, wherein the battery switch is controllable by the first detection circuit and the second detection circuit only when the battery charge enable signal indicates that battery charging is disabled.

10. The circuit of claim 1 wherein the external power supply is a DC-regulated voltage source.

11. A battery charging circuit having connections for connecting to an external power supply, a battery, and a load, the battery charging circuit comprising:
a voltage collapse protection (VCP) activation means for connecting the external power supply and the battery to the load when an electric current ("current") need of the load exceeds the current capacity of the external power supply;
a first signal means for sensing a current flow through the battery and asserting a first signal indicative of the current flow;
a second signal means for sensing the current flow through the battery and asserting a second signal indicative of the current flow; and
a VCP termination means for disconnecting the battery from the load when either the first signal is asserted or the second signal is asserted.

12. The circuit of claim 11 wherein the first signal means has a lower detection limit that is greater than a lower detection limit of the second signal means.

13. The circuit of claim 11 wherein the first signal means has a faster detection time than a detection time of the second signal means.

14. The circuit of claim 11 wherein the first signal means is an analog circuit and the second signal means is a digital circuit.

15. The circuit of claim 11 wherein the battery charging circuit further comprises a battery management system (BMS), wherein the first signal means is separate from the BMS, wherein the second signal means comprises circuitry in the BMS.

16. The circuit of claim 11 wherein the VCP activation means comprises a comparator connected to sense a voltage level of the external power supply and a voltage level of the battery.

17. A method in a battery charging circuit comprising:
activating a voltage collapse protection (VCP) operation in the battery charging circuit thereby providing current from an external power supply and current from a battery to a load when an electric current ("current") need of the load exceeds the current capacity of the external power supply;
sensing a current flow through the battery using a first detector circuit to assert a first signal indicative of the current flow through the battery and using a second detector circuit to assert a second signal indicative of the current flow through the battery; and
terminating the VCP operation when either the first signal is asserted by the first detector circuit or the second signal is asserted by the second detector circuit,
the first detector circuit having a first lower detection limit, the second detector circuit having a second lower detection limit that is smaller than the first lower detection limit.

18. The method of claim 17 wherein the first detector circuit has a detection time that is shorter than a detection time of the second detector circuit.

19. The method of claim 17 wherein the first detector circuit is an analog circuit and the second detector circuit is a digital circuit.

20. The method of claim 19 wherein the second detector circuit is an ADC circuit.

21. The method of claim 17 wherein the battery charging circuit comprises a battery management system (BMS), wherein the first detector circuit is separate from the BMS and the second detector circuit is a component of the BMS.

22. The method of claim 17 wherein terminating the VCP operation includes disconnecting the battery from the load.

* * * * *